A. SEARLS.
Carriage Top Prop.
No. 105,985.
Patented Aug. 2, 1870.
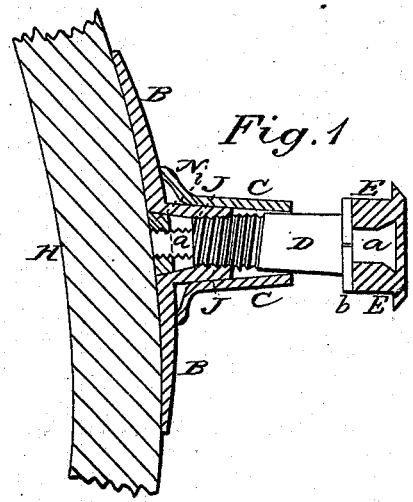
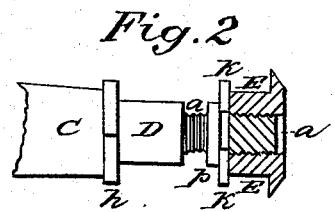
Witnesses:
Wm B Jessup
O. W. Young
Inventor:
Anson Searls

UNITED STATES PATENT OFFICE.

ANSON SEARLS, OF NEWARK, NEW JERSEY.

IMPROVEMENT IN TOP-PROPS FOR CARRIAGES.

Specification forming part of Letters Patent No. 105,985, dated August 2, 1870; antedated July 21, 1870.

*To all whom it may concern:*

Be it known that I, ANSON SEARLS, of Newark, county of Essex, State of New Jersey, have invented certain Improvements in Top-Props for Carriages, of which the following is a specification.

The nature and objects of my invention consist in making a hollow screw-bolt that forms the bearing and outside shoulder for the prop-joints, and to an ornamental capped bolt that passes through the hollow screw-bolt, holding it in place, the two making the bearing for the prop-joints adjustable and an absolute protection against the loss of the ornamental capped nut.

It also refers to making the socket into which the hollow screw-bolt screws angling to the bow-plate on the forward prop and shaping the cap to conform to the same.

It also refers to a check-nut that is used inside of the usual ornamental capped nut, and is an outside bearing for the prop-joints on the seat rail or standard, to make them adjustable and hold the joints surely in place.

In the drawings, Figure 1 is a view of the hollow screw-bolt D and a sectional view of the nuts *i* and E, the bow-plate B, socket *j*, cap *c*, and either end of the bolt *i*, and is the forward prop placed high on the turn of the bow. Fig. 2 is a view of the nut K and E as used on the standard or seat-rail of the sleeve-nut D and cap *c*.

The hollow screw-bolt D, Fig. 1, is made with a square or any regular form at *b* to turn it with and to form the outside shoulder of the prop-joints. The other end is provided with a thread. The bearing for the prop-joints is between the square *b* and any device into which the thread or other end is passed. Said bolt D is screwed up until the square *b* presses any thickness of prop-joints nicely. The bolt *a* is then screwed into the nut *i* until it holds the bolt D firmly in place.

*c* is a cap that forms the inside shoulder of the prop-joints and holds the leather to its place.

*d* is a socket, cast solid on the bow-plate B, and into which the bolt D screws.

The hole in the nut or ornamented head E is made square or in form other than cylindrical in the outer end. The screw *a* is driven or riveted into the square hole of the nut E until it will not turn round in the nut by any cause, the solder in ornamenting uniting with and holding the two firmly together. This mode of construction greatly reduces the cost from making them from one piece of iron. It might be screwed into the plate B or it might, as a wood-screw, enter the bow H.

The plate B is curved to the usual form of the bow H, where the forward prop comes high on the turn, the socket-projection *j* standing at a slightly-oblique angle to the bow-plate B, so as throw the bearing for the prop-joint in a horizontal position. The cap *c*, at N or base, is made to conform to the projection J and plate B.

K is a check-nut, that is placed on the seat rail or standard, so as to form the outside shoulder of the prop joints. The usual ornamental capped nut, E, Fig. 2, is then screwed against it, thereby locking each other. To utilize the space and make it light in appearance, the part P is made to form a part of the bearing of the prop-joints. The use of this nut makes the bearing of the prop-joints adjustable to any thickness of prop-joints and dispenses with leather washers and bad fits.

I claim—

1. The hollow screw-bolt D.

2. The screw *a* and nut E, when constructed and combined substantially as described.

3. The combination of the hollow screw-bolt D, bolt *a*, socket J, and cap *c*, substantially as and for the purpose set forth.

4. The bolt *a* and nut E, when combined and operated substantially as described.

5. The nut K, when used in combination with the ornamental capped nut E, to hold the prop-joints in place.

ANSON SEARLS.

Witnesses:
O. W. YOUNG,
WM. S. JESSUP.